(12) United States Patent
Mingrone et al.

(10) Patent No.: US 8,052,054 B1
(45) Date of Patent: Nov. 8, 2011

(54) TRACK QUALITY TO TRACK ERROR COVARIANCE

(75) Inventors: Joseph R. Mingrone, Medford, NJ (US); Michael L. Venuti, Cherry Hill, NJ (US); Edward C. Ryder, Cherry Hill, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 443 days.

(21) Appl. No.: 12/427,473

(22) Filed: Apr. 21, 2009

(51) Int. Cl.
*G06F 19/00* (2011.01)
*G06G 7/80* (2006.01)
*G01S 13/00* (2006.01)

(52) U.S. Cl. ............................ 235/411; 342/95; 235/400

(58) Field of Classification Search .................... 235/411
See application file for complete search history.

(56) References Cited

U.S. PATENT DOCUMENTS

2007/0216566 A1  9/2007  Wood

OTHER PUBLICATIONS

Lobbia, Robert N. and Owen, Mark, "Data Fusion Within a Constrained Communication Environment", Boeing Information, Space & Defense Systems, Seattle, WA, Feb. 1998.

*Primary Examiner* — Michael G Lee
*Assistant Examiner* — Laura Gudorf
(74) *Attorney, Agent, or Firm* — Howard IP Law Group, PC

(57) ABSTRACT

A computer-implemented method for estimating track error covariance of a sensor track data in a Link 16 tactical data link network from track quality involves receiving at a computer system the sensor track data on a ballistic target including the track quality and by estimating the track maturity, the position and velocity error covariance eigenvalues ($\lambda_p$, $\lambda_v$), and the position and velocity error covariances ($C_p$, $C_v$), the track error covariance of the sensor track data is calculated. The resulting error covariance is provided to the weapons control systems for more accurate engagement of the ballistic targets.

15 Claims, 2 Drawing Sheets

TRACK QUALITY TO TRACK ERROR COVARIANCE

CROSS-REFERENCE TO RELATED APPLICATION

None

FIELD OF THE INVENTION

This disclosure generally relates to netted tracking sensor systems operating over tactical data links such as sensor systems sharing track data used to monitor ballistic targets.

BACKGROUND

Target tracking sensor systems, such as radar systems, generate a track data about one or more targets being tracked by the target tracking sensor system and transmit the information to one or more computer systems. Track data comprises position vector and velocity vector and a measure of the data quality. Each of the one or more computer systems utilize the track data to monitor the target, assess the threat posed by the target and take appropriate actions as necessary. Therefore, knowledge of the accuracy of the track data is important for the command and decision system's operation.

Currently, the sensor track data containing the target's state vector (position and velocity) estimates are transmitted via a data link network to the one or more computer systems. For example, the computer systems may be the command and decision systems incorporated in land-based military defense facilities or ocean-going military vessels. The present disclosure relates to Link 16 tactical data link networks, which is an encrypted, jam-resistant, nodeless tactical digital data link network based on MIL-STD-6016.

In Link 16 networks, information on the error in the target's state vector estimates is characterized and transmitted to the various command and decision systems through a track quality (TQ) data. The sensor track data in Link 16 network is referred to as J3.6 messages and includes target track data and TQ data. TQ data quantifies the position error in the track data in terms of a 4 bit value (an integer ranging from 0 to 15) where the value maps to a range of position errors. A more accurate and useful characterization of the error in the target's state vector is the track data error covariance. However, because error covariance data takes 21 real numbers, the bandwidth constraints of the data link network only allows transmission of the track data error covariance upon request. Therefore, there is a need for improving the way the command and decision systems obtain the track data error covariance.

SUMMARY

The present disclosure describes an embodiment of a method for computing an estimated error covariance for a space track state based on the track TQ data and track maturity (i.e. time the target is in track). According to an implementation of the present disclosure, a computer-implemented method for estimating error covariance of a sensor track data from track quality comprises receiving at a computer system the sensor track data on a ballistic target including the track quality from a target tracking sensor system. The computer system records the time the target has been in track (post-burnout) and estimates the position error covariance eigenvalue ($\lambda_p$). The computer system estimates velocity error covariance eigenvalue ($\lambda_v$) from the estimated position error covariance eigenvalue ($\lambda_p$). The computer system estimates position error covariance ($C_p$), velocity error covariance ($C_v$), and estimates the error covariance of the sensor track data from $C_p$ and $C_v$, wherein the error covariance in a block matrix form is $$\begin{bmatrix} C_P & 0_3 \\ 0_3 & C_V \end{bmatrix}$$

where $0_3$ is a 3 by 3 zero matrix.

The method and systems described herein enables estimating the error covariance of track data in the sensor track data (J3.6 messages) based on the track TQ and track maturity thereby providing a more accurate representation of the track error which could reduce the need to request track data error covariance from the tracking sensor subsystems over the Link 16 data link network which may have bandwidth limitations.

BRIEF DESCRIPTION OF THE DRAWINGS

These and other features and advantages of the present invention will be more fully disclosed in the following detailed description of a preferred embodiment of the invention, which is to be considered together with the accompanying drawings wherein like numbers refer to like parts, and further wherein.

The description of the preferred embodiments herein is intended to be read in connection with the accompanying drawings, which are to be considered part of the entire written description of this invention.

DETAILED DESCRIPTION

Figure 1:
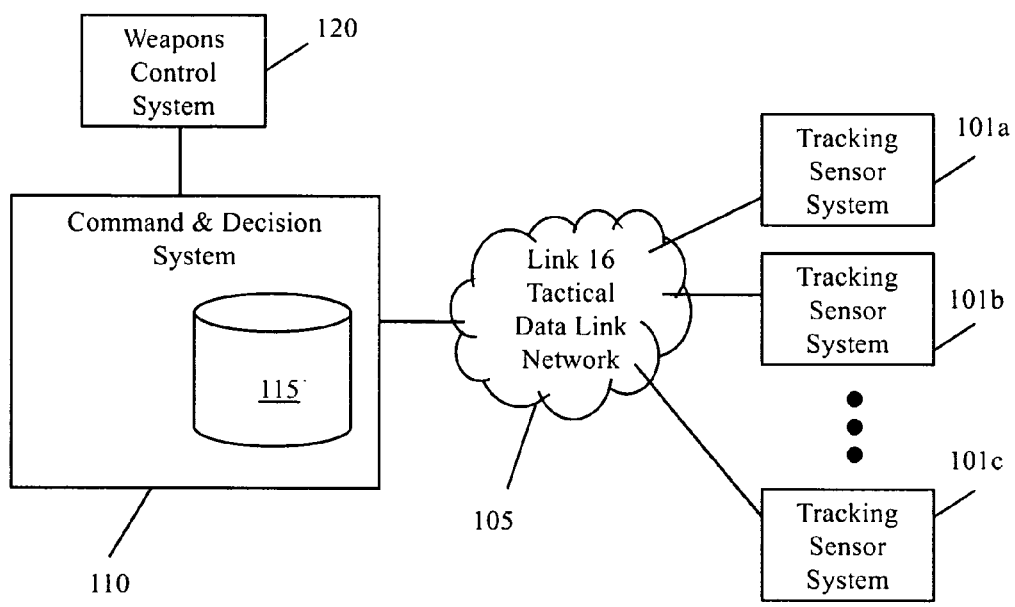
FIG. 1 is a schematic diagram of a system incorporating the method of the present disclosure.

FIG. 1 is a schematic illustration of an embodiment of a system 100 in which the disclosed computer-implemented method for estimating error covariance of a sensor track data in a Link 16 network is incorporated. The system 100 comprises one or more target tracking sensor systems such as subsystems 101a, 101b, 101c, a processing subsystem such as a computer subsystem 110, and a Link 16 network 105 connecting the computer subsystem 110 to the one or more target tracking subsystems 101a, 101b, 101c. The target tracking subsystems track and monitor ballistic targets and provides sensor track data containing the target track data and TQ data on the ballistic targets to the computer subsystem 110 via the data link network 105. A weapons control system 120 can also be linked to the computer subsystem 110. The computer subsystem 110 provides the commands and target information to the weapons control system 120 for taking actions against the target. An example of such a computer subsystem 110 is the Aegis Combat System's command and decision system in which the computer-implemented method of the present disclosure may be implemented.

The system 100 also includes a machine-readable storage medium 115 that is associated with the computer subsystem 110. The machine-readable storage medium 115 is encoded with computer program code, such that, when the computer program is executed by a processor, such as the computer subsystem 110, the processor performs the method for estimating error covariance of a sensor track data described herein. Such machine-readable storage medium 115 can be a single data storage unit or a storage system comprising multiple data storage units that are connected to the computer subsystem 110. Such machine-readable storage medium 115 can include magnetic, optical or solid-state storage media, or a combination thereof. The machine-readable storage medium 115 can also include portable machine-readable storage devices such as a random access memory device, a read only memory device, a magnetic medium such as a hard-drive or a floppy disk, or an optical medium such as a Compact Disc, a DVD, etc. that are loaded on to the computer subsystem 110 to allow the command and decision system 110 to access the computer program code encoded thereon.

Figure 2:
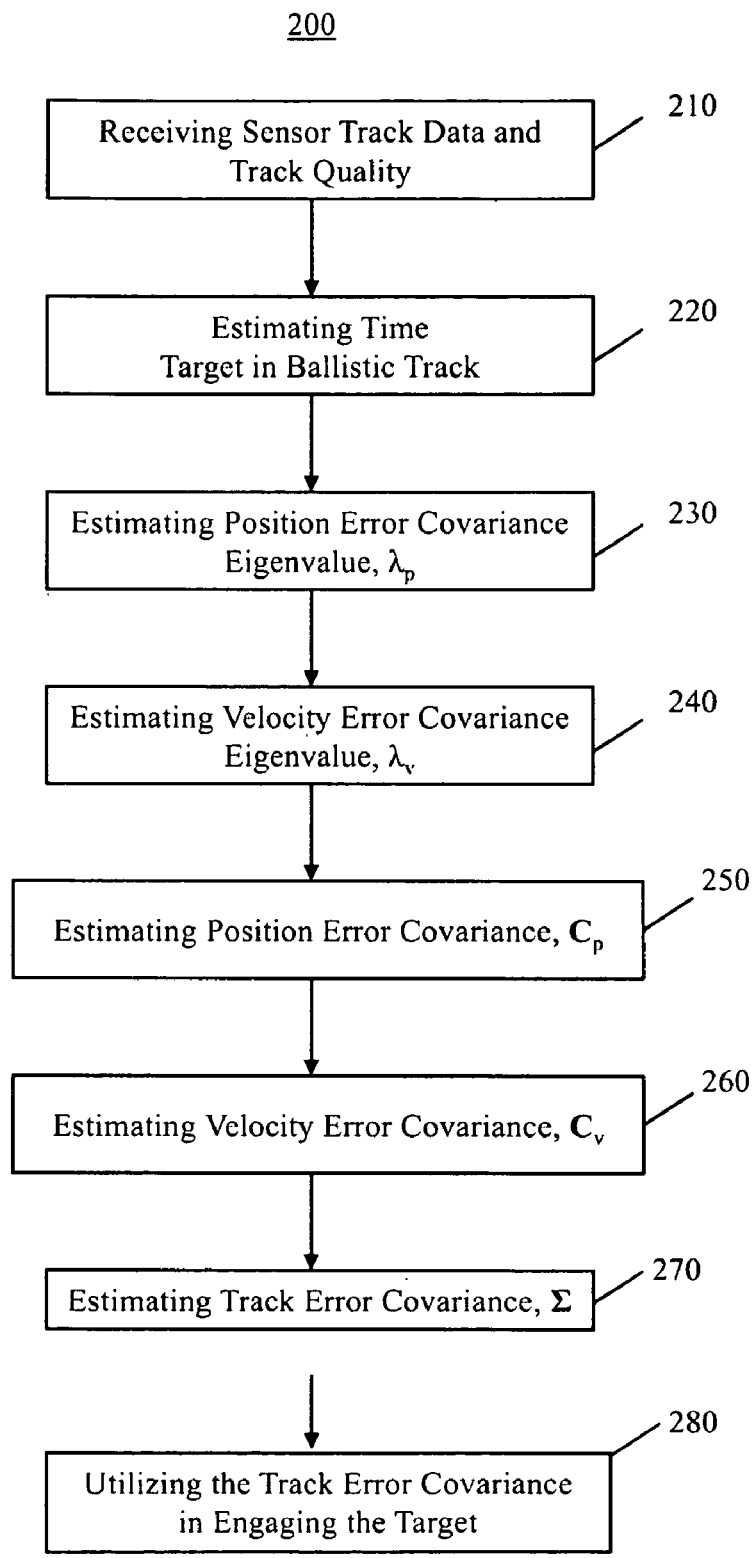
FIG. 2 is a flow chart illustrating the method of the present disclosure.

Referring to the flow chart 200 shown in FIG. 2, the method for estimating error covariance of a sensor track data from the track TQ and track maturity (the time the ballistic target is in track) is described. The sensor track data and track TQ are received at the system's computer subsystem 110. (See block 210). First, the duration the target is in ballistic track is estimated. This done by recording the difference in time between the first track report valid time and the current valid track in the sensor track data. (See block 220). As TQ is a measure of the position uncertainty of a track the inventors have taken an approach to derive an estimate of the velocity error from position error. For an optimal least squares filter the error covariance after k measurements can be pre-computed. The method first estimates the maximum eigenvalue $\lambda_p$ of the position error covariance of the track. (See block 230). Then, by assuming the position/velocity error relationship of a least squares track filter the maximum eigenvalue $\lambda_v$ of the velocity error covariance of the track is calculated. (See block 240). The derived covariance is then constructed by constructing a spherical position covariance $C_p$ (see block 250) and velocity covariance $C_v$ (see block 260) from the position and velocity eigenvalues $\lambda_p, \lambda_v$. And from the position and velocity covariances $C_p, C_v$, the track error covariance, $\Sigma$, is estimated. (See block 270). The track error covariance, $\Sigma$, is then provided to the weapons control system 120 and utilized in engaging the ballistic target. (See block 280).

Each of the above enumerated steps will now be discussed in more detail. Consider an x, ẋ least squares filter with the following model/noise assumptions:

The target state estimate is derived from position measurements from a constant velocity target;
The track position errors are independent and with identical 0-mean and variance, $\sigma^2$;
The measurements are taken every $\delta t$ seconds;

then the error covariance of the target state after k measurements, P(k), is given by:

$$P(k) = \frac{2\sigma_m^2}{k(k+1)} \begin{pmatrix} 2k-1 & \frac{3}{\delta t} \\ \frac{3}{\delta t} & \frac{6}{\delta t^2(k-1)} \end{pmatrix}. \quad (1)$$

Taking the ratio, $\kappa$, of the velocity variance $\sigma_v^2$ and position variance $\sigma_p^2$, we have:

$$\kappa = \frac{\sigma_v^2}{\sigma_p^2} = \frac{6/\delta t^2(k-1)}{2k-1} = \frac{6}{\delta t^2(2k-1)(k-1)} \approx \frac{6}{\delta t^2(2k^2)} = \frac{3}{T^2}, \quad (2)$$

where the approximation is close for k>10, and T=k δt is the total time the target object is in track.

TQ is a scalar indicator of uncertainty with a range from 1 to 15. Higher numbers represent less uncertainty in the track state, e.g. 15 represents the smallest uncertainty and 1 represents the greatest uncertainty. Converting a full 6 by 6 state covariance to a TQ is computed as follows:

1. Let B=tr($S_p$)+$(\Delta t)^2$ tr($S_v$), where $S_p$ is the 3 by 3 position covariance and $S_v$ the 3 by 3 velocity covariance (in ft$^2$/s$^2$). The value of B is the trace of the position covariance propagated forward $\Delta t$ seconds. Note that $\Delta t$ is a link parameter that propagates position covariance. The value is nominally 6 seconds (0-24 sec range).

2. Set $$K = \frac{\log(B/M_0)}{\log(a)},$$

where $M_0$ equals 4800 ft.$^2$, a=3.25, and log(•) is the (natural) logarithm function.

3. TQ=fl(15−K), where fl(•) is floor (or greatest integer) function.

From 2. above it is evident that B can be recovered from K since B=$M_0$ $a^K$, however, the command and decision system 110 only receive TQ from the sensor systems and TQ=15−K−η, where η is due to the truncation in the floor function and has values 0≦η<1.

The recovery of B from TQ is accomplished by: B=$M_0$ $a^{15-TQ}$. Applying this recovery scheme, the recovered B value, B' is given by:

$$\begin{aligned} B' &= M_0 a^{15-TQ} \quad (3) \\ &= M_0 a^{15-(15-K-\eta)} \\ &= M_0 a^K a^\eta \\ &= B a^\eta \end{aligned}$$

Thus, recovering B from TQ gives a value, B', that is $a^\eta$ times larger than the value of B. Assuming uniform truncation error, we can settle on a nominal value of η=0.5, yielding $a^\eta \approx 1.8$. Now, we are in position to define the algorithm for approximating tr($S_v$) from TQ.

We start with (3):

$$\begin{aligned} a^{-\eta} M_0 a^{15-TQ} &= B \quad (4) \\ &= tr(S_P) + \Delta t^2 tr(S_V) \\ &= tr(S_P) + \Delta t^2 \left\{ tr(S_P) \frac{3}{T^2} \right\}, \quad \text{by (2)} \\ &= tr(S_P) \left( 1 + \frac{3\Delta t^2}{T^2} \right). \end{aligned}$$

Substituting in $a^\eta$=1.8 and solving for tr($S_p$) we get:

$$tr(S_P) = \frac{M_0 a^{15-TQ}}{1.8\left(1 + \frac{3\Delta t^2}{T^2}\right)} \quad (5)$$

Lastly, we use the approximation in (2) to estimate tr($S_v$) as a function of TQ and T, $$tr(S_V) = \frac{M_0 a^{15-TQ}}{1.8\left(1+\frac{3\Delta t^2}{T^2}\right)}\left(\frac{3}{T^2}\right) \quad (6)$$

$$= \frac{5M_0 a^{15-TQ}}{3(T^2+3\Delta t^2)}$$

The maximum eigenvalues in position, $\lambda_p$, and velocity, $\lambda_v$, are now constructed from the trace estimates (5) and (6) above under the assumption that two of the eigenvalues are equal and large and one is relatively negligible. This assumption is borne out through observation and originates from the fact that the radar cross range error dominates the radar range error.

By assuming that $tr(S_p)=2\lambda_p$ and $tr(S_v)=2\lambda_v$, we have:

$$\lambda_p = \frac{tr(S_P)}{2} = \frac{M_0 a^{15-TQ}}{3.6\left(1+\frac{3\Delta t^2}{T^2}\right)}, \quad \text{and} \quad (7)$$

$$\lambda_v = \frac{tr(S_v)}{2} = \frac{5M_0 a^{15-TQ}}{6(T^2+3\Delta t^2)}. \quad (8)$$

The estimated position error covariance, $C_p$, and velocity error covariance, $C_v$, are defined by;

$C_p=\lambda_p I_3$ and $C_v=\lambda_v I_3$, where $I_3$ is a 3 by 3 identity matrix.

From these partial covariances, $C_p$ and $C_v$, the track error covariance, $\Sigma$, is constructed. $\Sigma$ is a full (6 by 6) matrix $$\sum = \begin{bmatrix} C_P & 0_3 \\ 0_3 & C_V \end{bmatrix},$$

where $0_3$ is the 3 by 3 zero matrix. Thus, the track error covariance $\Sigma$ can be calculated from the TQ and track maturity data and allows the computer sub system 110 to more accurately determine various parameters about the target being tracked, such as predicting the target's impact point, estimating the impact point area of uncertainty, estimating the launch point of the target, and associating the target to a possible launch event, etc. With more accurate target parameters, the computer subsystem 110 can provide more accurate information to the weapons control system 120 which utilizes the track error covariance, $\Sigma$, for taking an appropriate action against the target, such as engaging the target by deploying a missile to intercept and destroy the target. (See block 280 of FIG. 2).

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A computer-implemented method for estimating track error covariance of a sensor track data in a Link 16 tactical data link network from track quality, said method comprising:
   receiving at a computer system the sensor track data on a ballistic target including the track quality from a target tracking sensor system;
   the computer system estimating a time that the target has been in ballistic track;
   the computer system estimating position error covariance eigenvalue ($\lambda_p$);
   the computer system estimating velocity error covariance eigenvalue ($\lambda_v$) from the estimated position error covariance eigenvalue ($\lambda_p$);
   the computer system estimating position error covariance ($C_p$);
   the computer system estimating velocity error covariance ($C_v$); and
   the computer system estimating an error covariance of the sensor track data from $C_p$ and $C_v$, wherein the track error covariance of the sensor track data in a block matrix form is $$\begin{bmatrix} C_P & 0_3 \\ 0_3 & C_V \end{bmatrix},$$

where $0_3$ is a 3 by 3 zero matrix.

2. The computer-implemented method of claim 1, further comprising the computer system providing the error covariance of the sensor track data to a weapons control system wherein the weapons control system takes an action against the ballistic target.

3. The computer-implemented method of claim 1, wherein $$\lambda_p = \frac{M_0 a^{15-TQ}}{3.6\left(1+\frac{3\Delta t^2}{T^2}\right)},$$

where TQ is the track quality, T is estimated time that the target has been in ballistic track, $\Delta t$ is time interval between measurements that generated the sensor track data, $M_0=4800$ ft$^2$, and $a=3.25$.

4. The computer-implemented method of claim 3, wherein $$\lambda_v = \frac{5M_0 a^{15-TQ}}{6(T^2+3\Delta t^2)}.$$

5. The computer-implemented method of claim 4, wherein $C_p=\lambda_p I_3$ and $C_v=\lambda_v I_3$, where $I_3$ is a 3 by 3 identity matrix.

6. A machine-readable storage medium encoded with computer program code, such that, when the computer program code is executed by a computer system, the computer system performs a method for estimating track error covariance of a sensor track data from track quality, said method comprising:
   receiving at a computer system the sensor track data on a ballistic target including the track quality from a target tracking sensor system;
   the computer system estimating a time that the target has been in ballistic track;
   the computer system estimating position error covariance eigenvalue ($\lambda_p$);
   the computer system estimating velocity error covariance eigenvalue ($\lambda_v$) from the estimated position error covariance eigenvalue ($\lambda_p$);
   the computer system estimating position error covariance ($C_p$);
   the computer system estimating velocity error covariance ($C_v$); and
   the computer system estimating the error covariance of the sensor track data from $C_p$ and $C_v$, wherein the track error covariance of the sensor track data in a block matrix form is $$\begin{bmatrix} C_P & 0_3 \\ 0_3 & C_V \end{bmatrix},$$

where $0_3$ is a 3 by 3 zero matrix.

7. The machine-readable storage medium of claim 6, wherein the method performed by the computer system further comprising the computer system providing the error covariance of the sensor track data to a weapons control system wherein the weapons control system takes an action against the ballistic target.

8. The machine-readable storage medium of claim 6, wherein $$\lambda_p = \frac{M_0 a^{15-TQ}}{3.6\left(1 + \frac{3\Delta t^2}{T^2}\right)},$$

where TQ is the track quality, T is estimated time that the target has been in ballistic track, $\Delta t$ is time interval between measurements that generated the sensor track data, $M_0 = 4800$ ft$^2$, and $a = 3.25$.

9. The machine-readable storage medium of claim 8, wherein $$\lambda_v = \frac{5 M_0 a^{15-TQ}}{6(T^2 + 3\Delta t^2)}.$$

10. The machine-readable storage medium of claim 9, wherein $C_p = \lambda_p I_3$ and $C_v = \lambda_v I_3$, where $I_3$ is a 3 by 3 identity matrix.

11. A system for estimating error covariance of a sensor track data comprising:
   one or more target tracking sensor systems for tracking targets; and
   a computer subsystem responsive to the one or more sensor subsystems and configured to execute the computer program code encoded on a machine-readable storage medium encoded with computer program code, such that, when the processing subsystem executes the computer program code, the computer subsystem performs a method for estimating track error covariance of a sensor track data from track quality provided by at least one of the target tracking sensor systems, said method comprising:
   receiving at the computer subsystem the sensor track data on a ballistic target including the track quality from one of the target tracking sensor systems;
   the computer subsystem estimating a time that the target has been in ballistic track;
   the computer subsystem estimating position error covariance eigenvalue ($\lambda_p$);
   the computer subsystem estimating velocity error covariance eigenvalue ($\lambda_v$) from the estimated position error covariance eigenvalue ($\lambda_p$);
   the computer subsystem estimating position error covariance ($C_p$);
   the computer subsystem estimating velocity error covariance ($C_v$); and
   the computer subsystem estimating the error covariance of the sensor track data from $C_p$ and $C_v$, wherein the track error covariance in a block matrix form is $$\begin{bmatrix} C_P & 0_3 \\ 0_3 & C_V \end{bmatrix},$$

where $0_3$ is a 3 by 3 zero matrix.

12. The system of claim 11, wherein the method performed by the computer subsystem further comprising the computer subsystem providing the error covariance of the sensor track data to a weapons control system wherein the weapons control system takes an action against the ballistic target.

13. The system of claim 11, wherein $$\lambda_p = \frac{M_0 a^{15-TQ}}{3.6\left(1 + \frac{3\Delta t^2}{T^2}\right)},$$

where TQ is the track quality, T is estimated time that the target has been in ballistic track, $\Delta t$ is time interval between measurements that generated the sensor track data, $M_0 = 4800$ ft$^2$, and $a = 3.25$.

14. The system of claim 13, wherein $$\lambda_v = \frac{5 M_0 a^{15-TQ}}{6(T^2 + 3\Delta t^2)}.$$

15. The system of claim 14, wherein $C_p = \lambda_p I_3$ and $C_v = \lambda_v I_3$, where $I_3$ is a 3 by 3 identity matrix.

\* \* \* \* \*